(12) United States Patent
Karremans et al.

(10) Patent No.: US 8,070,228 B2
(45) Date of Patent: Dec. 6, 2011

(54) CHILD VEHICLE SEAT

(75) Inventors: Taco Karremans, Eindhoven (NL);
Petrus Henricus Maria Stokman,
Hoensbroek (NL); Mark Schrooten,
Antwerp (BE)

(73) Assignee: Cosco Management, Inc., Wilmington, DE (US)

( * ) Notice: Subject to any disclaimer, the term of this patent is extended or adjusted under 35 U.S.C. 154(b) by 49 days.

(21) Appl. No.: 12/691,416

(22) Filed: Jan. 21, 2010

(65) Prior Publication Data

US 2010/0207436 A1 Aug. 19, 2010

(30) Foreign Application Priority Data

Jan. 23, 2009 (NL) ...................................... 1036453

(51) Int. Cl.
*A47D 1/10* (2006.01)
(52) U.S. Cl. .................................................. 297/256.16
(58) Field of Classification Search .............. 297/256.16
See application file for complete search history.

(56) References Cited

U.S. PATENT DOCUMENTS

| | | | | |
|---|---|---|---|---|
| 5,052,750 | A | * | 10/1991 | Takahashi et al. .... 297/256.16 X |
| 5,567,008 | A | * | 10/1996 | Cone, II .................... 297/256.16 |
| 5,890,762 | A | * | 4/1999 | Yoshida ............... 297/256.16 X |
| 6,695,400 | B2 | * | 2/2004 | Washizuka et al. .... 297/217.2 X |
| 7,090,294 | B2 | * | 8/2006 | Balensiefer, II et al. . 297/256.14 |
| 7,597,396 | B2 | * | 10/2009 | Longenecker et al. .. 297/256.16 X |
| 2011/0089732 | A1 | * | 4/2011 | Yang ........................ 297/256.16 |

FOREIGN PATENT DOCUMENTS

| | | |
|---|---|---|
| EP | 1731355 | 12/2006 |
| EP | 1369295 | 4/2008 |
| EP | 1997673 | 12/2008 |
| WO | 2005108155 | 11/2005 |

OTHER PUBLICATIONS

International Search Report and Written Opinion dated Apr. 24, 2009, for Dutch Application No. 1036453.

* cited by examiner

*Primary Examiner* — Rodney B White
(74) *Attorney, Agent, or Firm* — Barnes & Thornburg LLP (57) ABSTRACT

A child restraint comprises a base and a seat which can be detachably connected to the base.

20 Claims, 10 Drawing Sheets

CHILD VEHICLE SEAT

This application claims priority under 35 U.S.C. §119(a) to Dutch Patent Applications No. NL 1036453, filed Jan. 23, 2009 which is expressly incorporated by reference herein.

BACKGROUND

The present disclosure relates to a child restraint, and particularly to a child restraint including a base and a seat. More particularly, the present disclosure relates a child restraint including a seat that is coupled detachably to a base.

SUMMARY

A child restraint in accordance with the present disclosure includes a seat and a base. The seat is coupled detachably to the base.

In illustrative embodiments, the child restraint further includes a seat retainer arranged to detachably couple the seat to the base. The seat retainer includes a pair of pins coupled to the seat, a set of hooks coupled to the base to move between a first position and a second position. The hooks upon moving to the first position are configured to receive the pins. The hooks upon moving to the second position are configured to retain the pins and couple the seat to the base.

In illustrative embodiments, the seat retainer further includes slide coupled to the hooks. The slide is configured to move between an initial position wherein the hooks are free to move between the first and second positions and a locking position wherein the hooks are retained in the second position.

Additional features of the present disclosure will become apparent to those skilled in the art upon consideration of illustrative embodiments exemplifying the best mode of carrying out the disclosure presently perceived.

BRIEF DESCRIPTION OF THE DRAWINGS

The detailed description particularly refers to the accompanying figures in which.

DETAILED DESCRIPTION

Like parts are indicated by the same numerals in the various figures.

Figure 1:
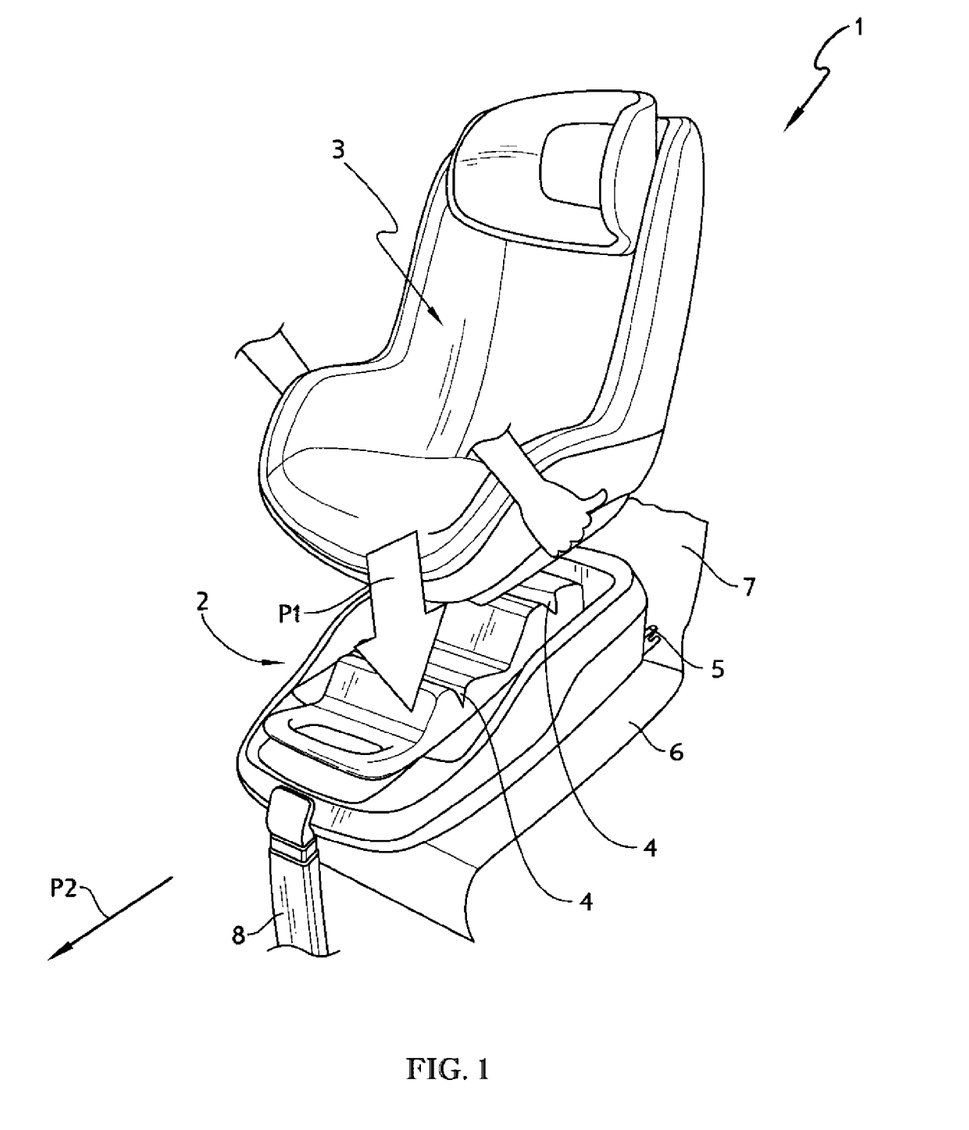
FIG. 1 is a perspective view of a child restraint according to the present disclosure.

FIG. 1 shows a child restraint 1 according to the present disclosure comprising a base 2 and a seat 3 which is connectable to the base to by moving the seat 3 in a direction indicated by arrow P1. The seat 3 comprises belts to secure a child in the seat 3. The base 2 is provided with two elongated recesses 4 which extend perpendicular to the driving direction indicated by arrow P2 of the vehicle (not shown) into which the child vehicle seat 1 is mounted. The base 2 is provided with connectors 5 which are detachably connectable to brackets available in vehicle between a vehicle seat 6 and a back rest 7 of the vehicle seat. Such a manner of connecting a base to a vehicle seat is well known and will therefore not further be explained.

The base 2 is also provided with a leg 8 which rests with an end remote of the base 2 on the floor of the vehicle. Such a leg 8 is well known and will therefore not be further explained.

Figure 2:
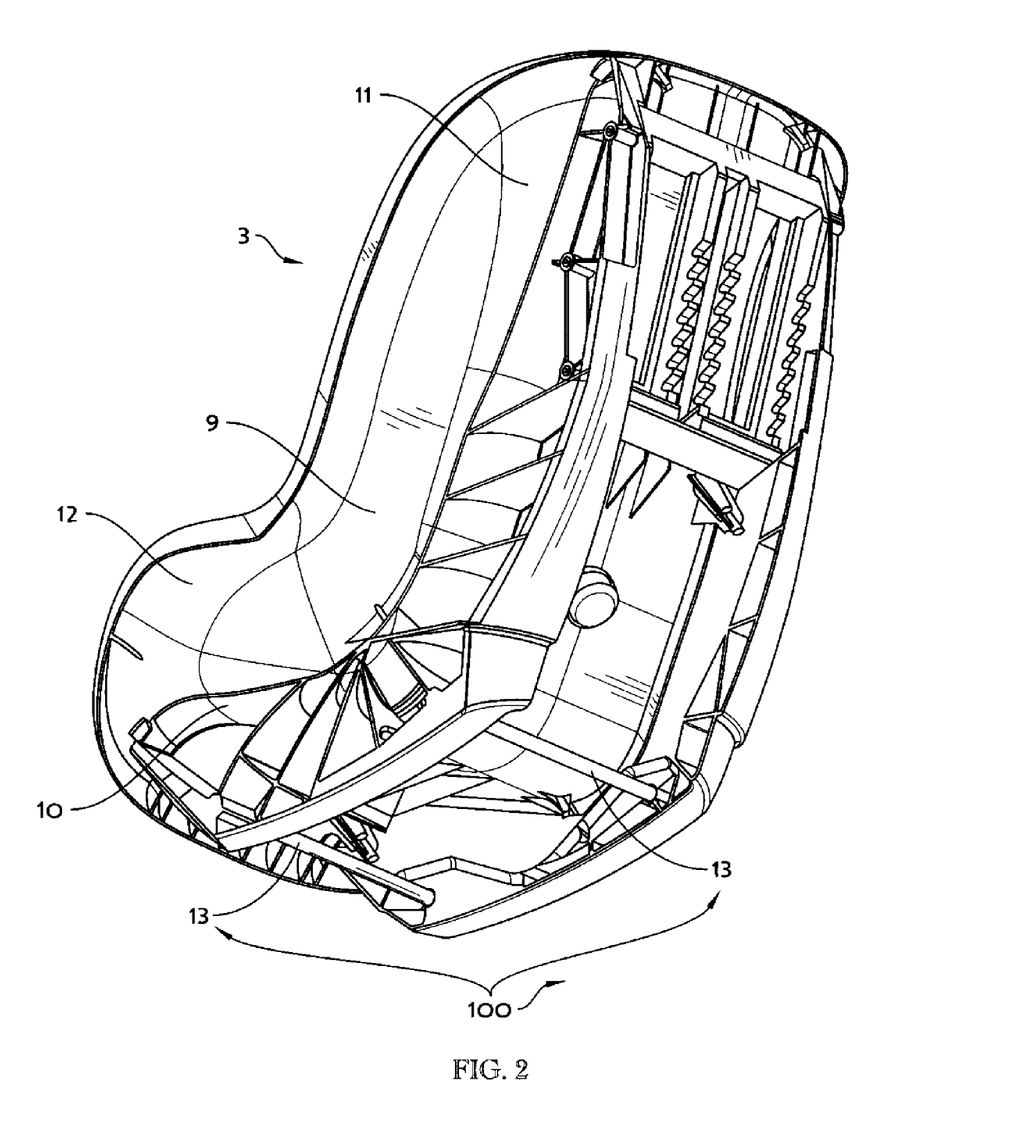
FIG. 2 is a perspective rear view of the seat of the child restraint as shown in FIG. 1.

FIG. 2 shows the seat 3 of the child vehicle seat 1 as shown in FIG. 1, which seat 3 is provided with a shell-shaped part 9. The shell-shaped part 9 comprises a seat part 10, a back rest 11 and side rests 12 for supporting the child sitting in the seat 3.

As shown in FIG. 2-5D, the child restraint 1 further includes a seat retainer 100. Seat retainer 100 includes two longitudinal pins 13 and various components coupled to the base. Illustratively, two longitudinal pins 13 are coupled to a lower portion of seat 3 and are arranged to extend parallel to each other and located at a distance of each other corresponding to the distance between the recesses 4 of the base 2. The pins 13 can be positioned in the recesses 4 in a way which will be explained with reference to the FIGS. 3A-5D.

Figure 3A:
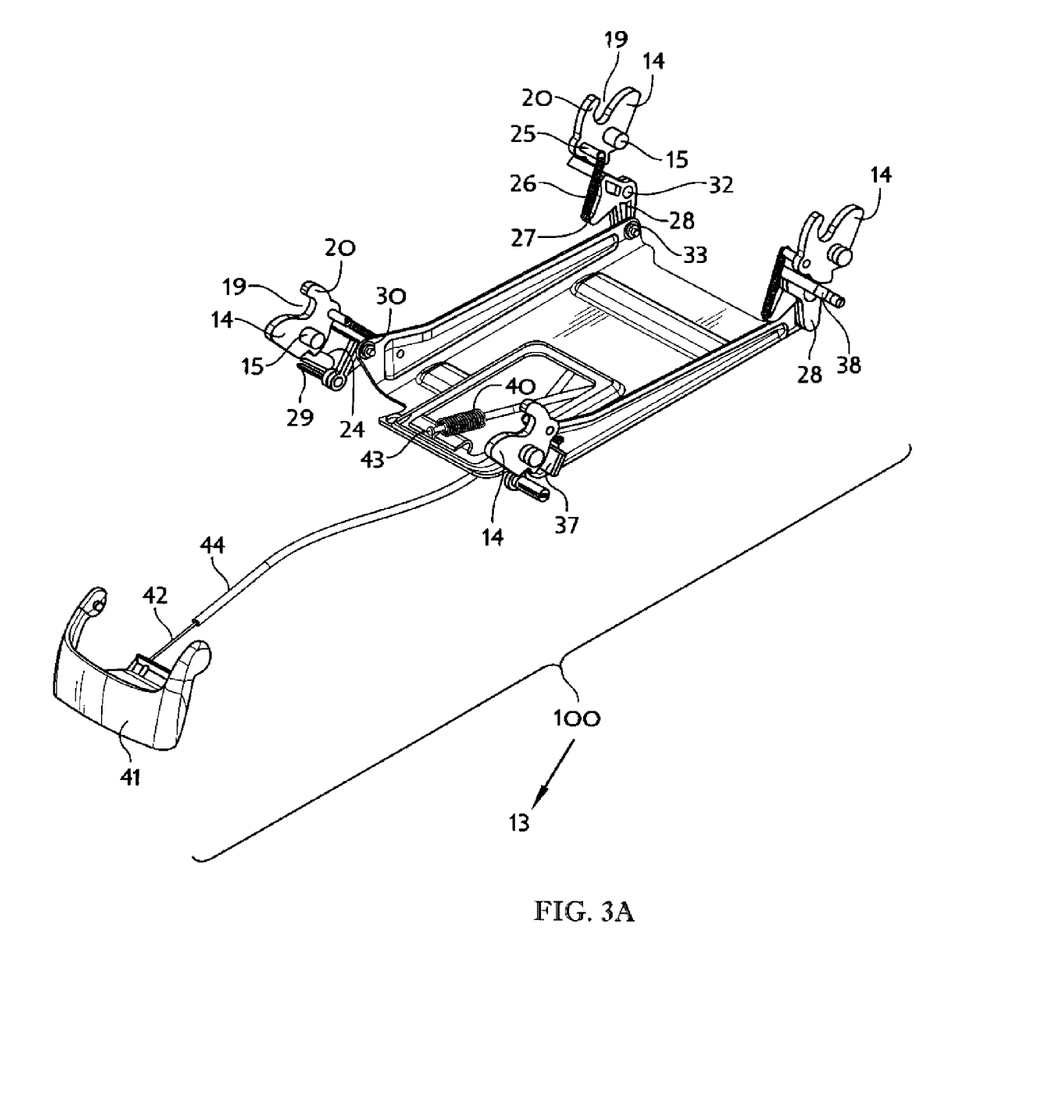
FIGS. 3A and 3B are a perspective view and side view of a part of the base with the hooks in a first position and the slide in an initial position.
Figure 3B:
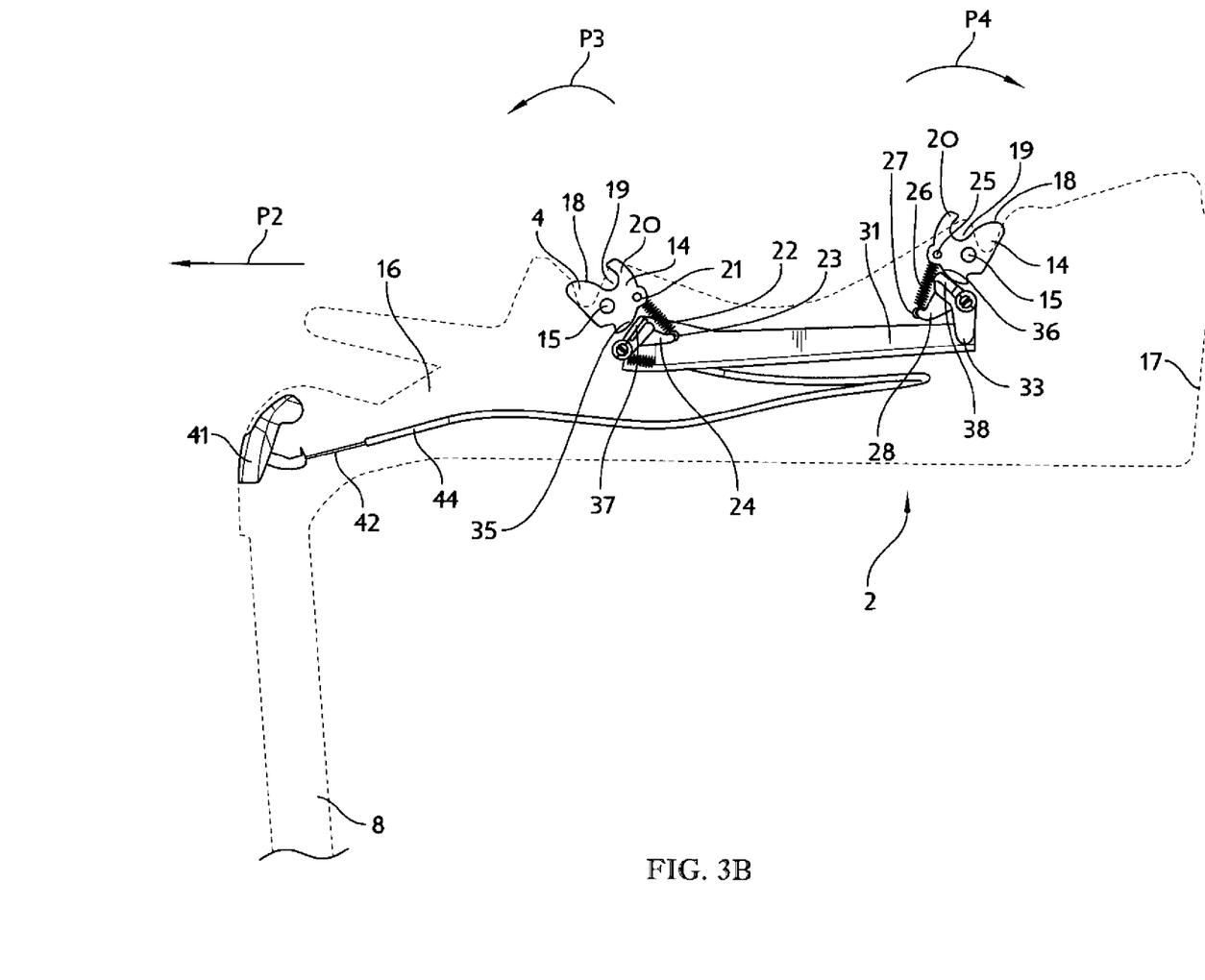

FIGS. 3A and 3B show respectively a perspective view and a side view of a part of the base 2. The seat retainer further includes four hooks 14 each being rotatable with respect to the base 2 around an axis 15. Two hooks 14 are located near the front side 16 of the base 2 whilst two other hooks 14 are located near the rear side 17 of the base 2. In the FIGS. 3A and 3B the hooks 14 are in a first position whereby an abutment surface 18 of each hook 14 is located in the recess 4 whilst a notch 19 and a gripping surface 20 on each hook 14 are located outside the recess 4.

Each hook 14 located near the front side 16 of the base 2 is connected at a location 21 remote of the abutment surface 18 by means of a spring 22 to an end 23 of the first locking element 24. The hook 14 on the front side 16 and the locking element 24 are shown on an enlarged scale in FIG. 5C.

Figure 5A:
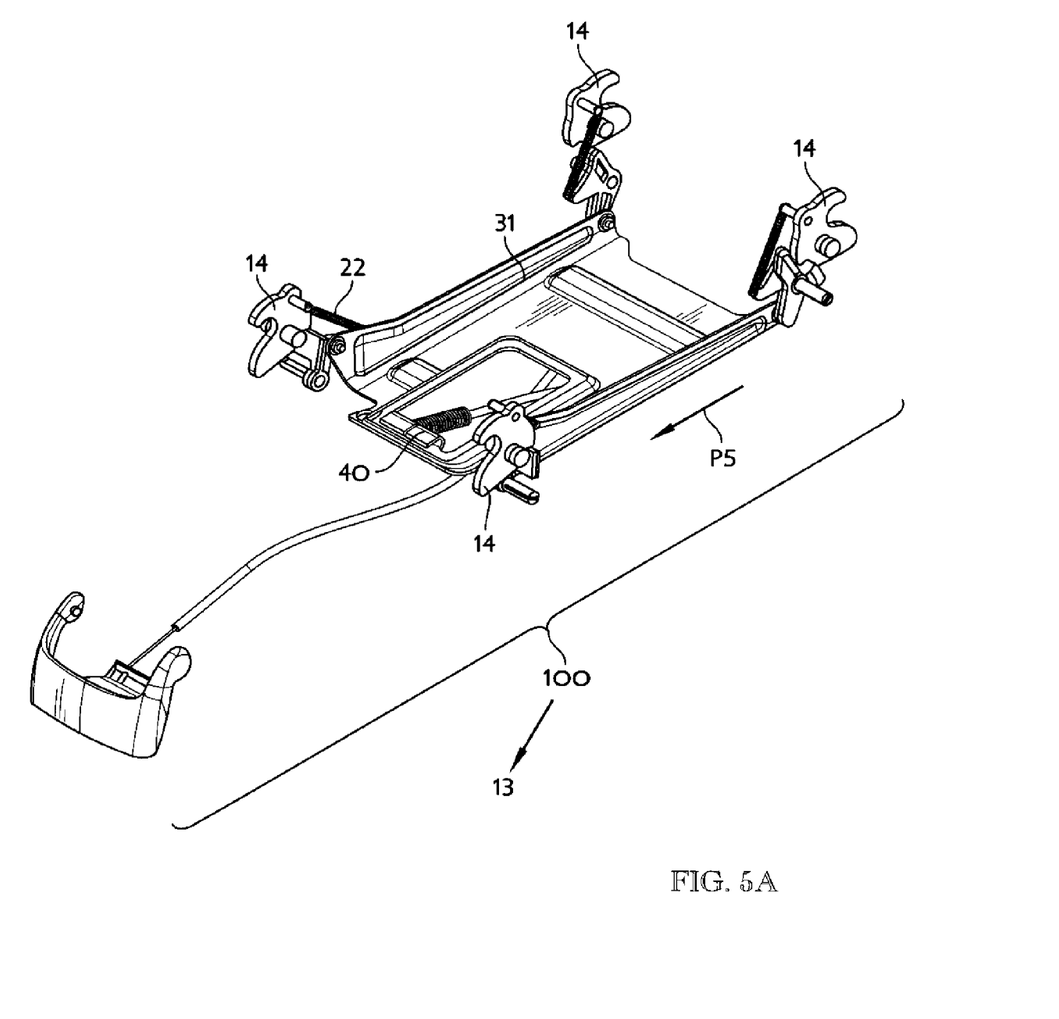
FIGS. 5A and 5B are a perspective view and side view of a part of the base with the hooks in a second position and the slide in a locking position.
Figure 5B:
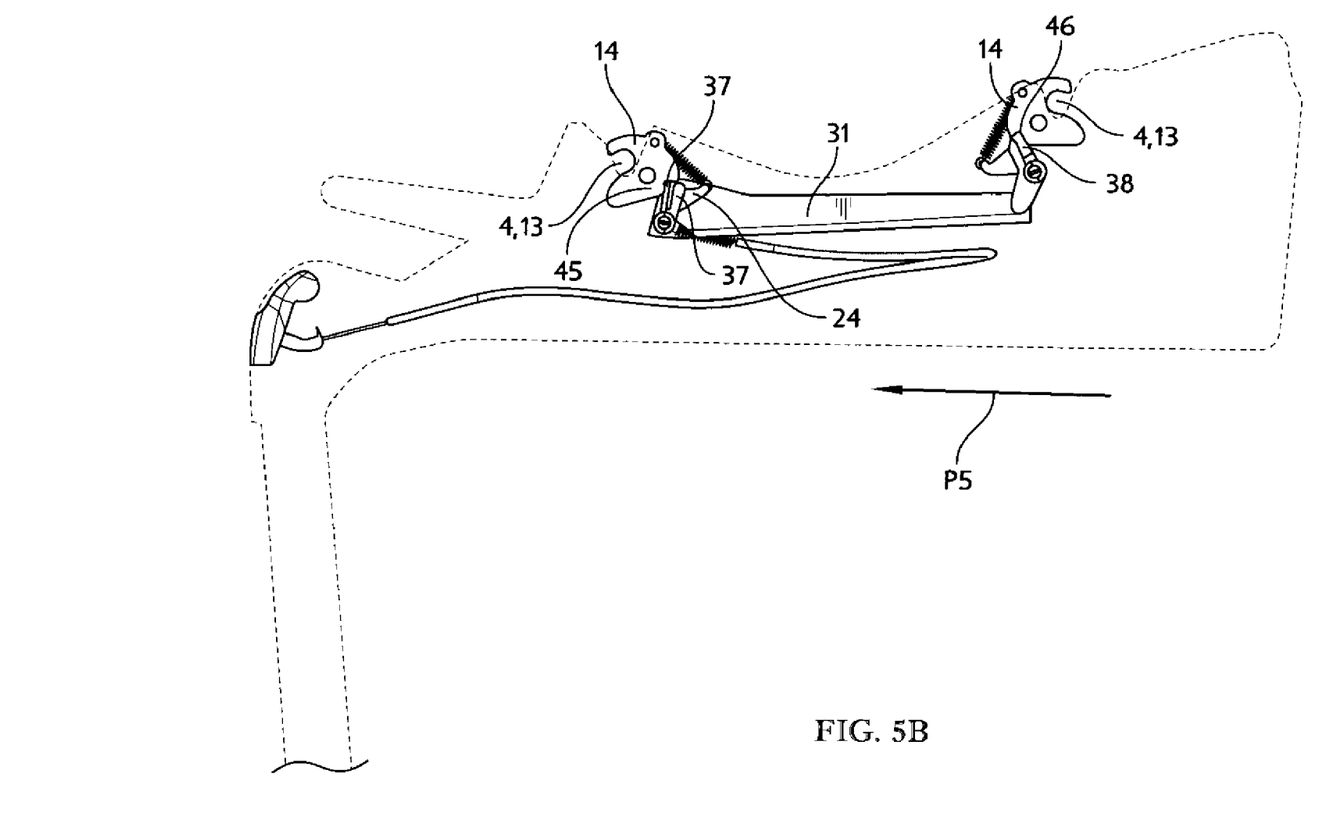
Figure 5C:
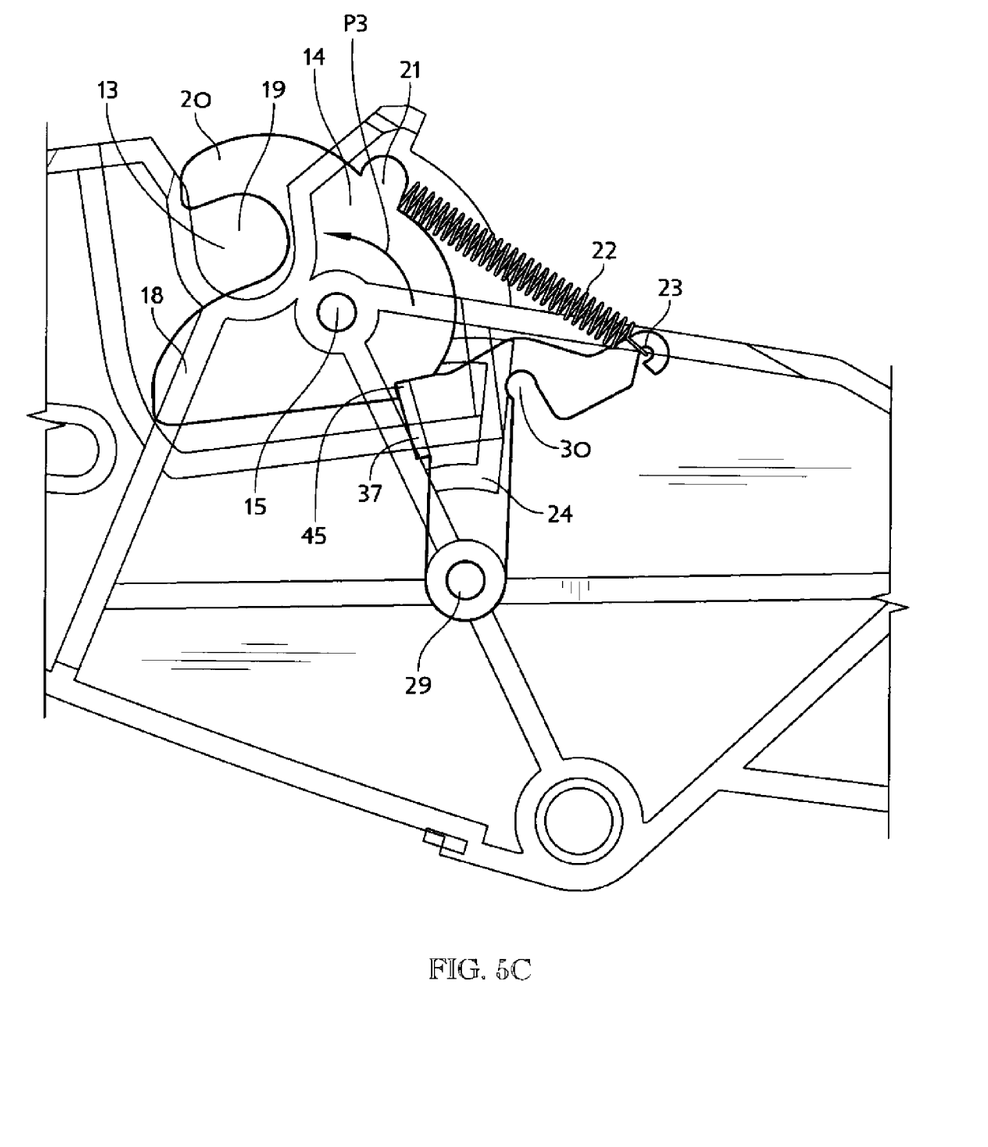
FIG. 5C is a side view of a hook on the front side of the base as shown in FIGS. 5A and 5B.

The hooks 14 on the front side 16 of the base 2 are rotatable against spring force of the spring 22 about axis 15 in the direction indicated by arrow P3.

Each hook 14 located near the rear side 17 of the base 2 is connected at a location 25 remote of the abutment surface 18 by means of a spring 26 to an end 27 to a second locking element 28. The hook 14 on the rear side 17 and the locking element 28 are shown on an enlarged scale in FIG. 5D.

Figure 5D:
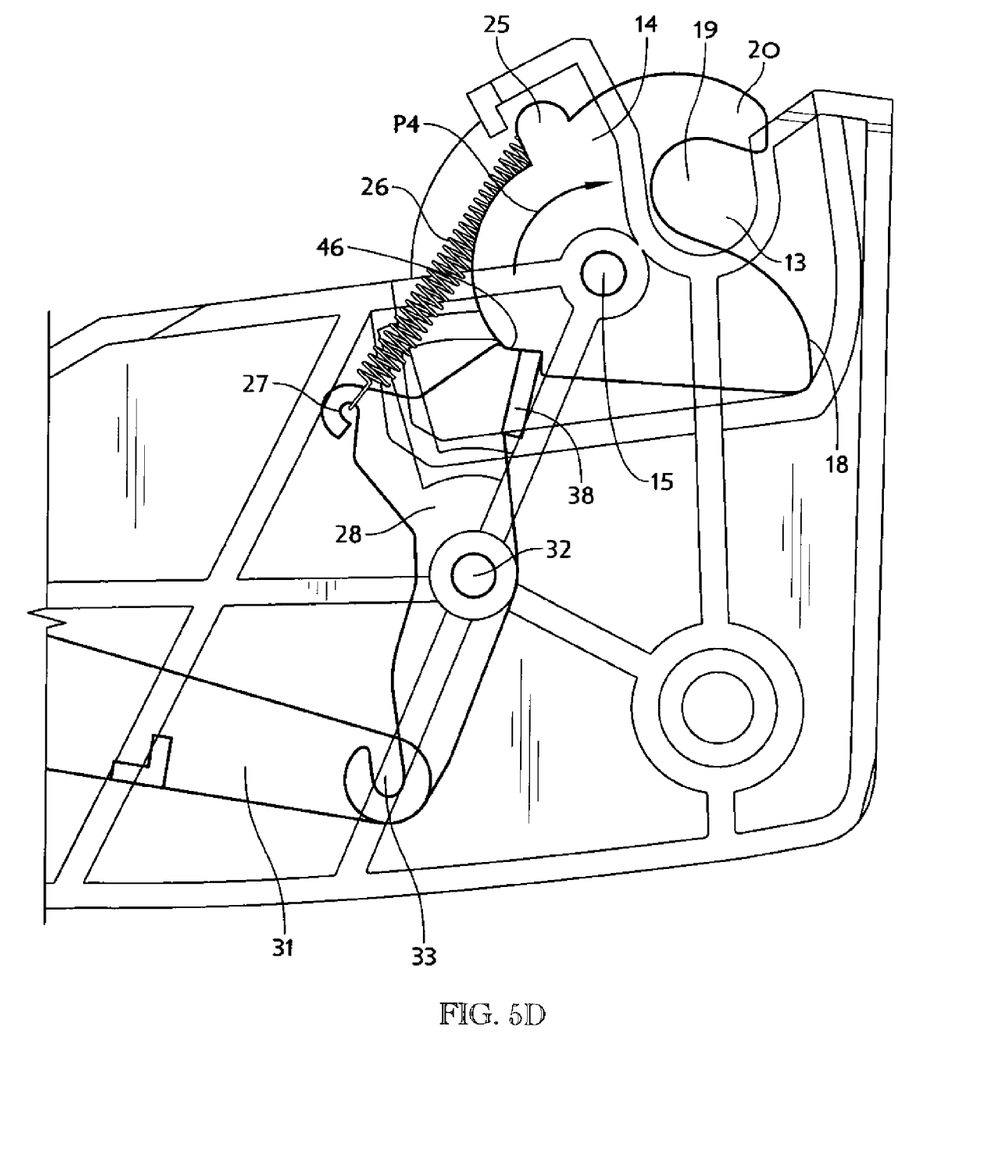
FIG. 5D is a side view of a hook on the rear side of the base as shown in FIGS. 5A and 5B.

The hooks 14 on the rear side 17 of the base 2 are rotatable against spring force of the spring 26 about axis 15 in the direction indicated by arrow P4.

Each first locking element 24 is pivotably with respect to the base 2 about an axis 29 and is pivotably connected between the end 23 and the axis 29 at a position 30 in to a slide 31.

Each second locking element 28 is pivotably connected to the base 2 about an axis 32 and is pivotably connected with an end 33 remote from the end 27 to the slide 31. In the position as shown in FIGS. 3A-3B, the hooks 14 are in the first position whereby stopping surfaces 35 respectively 36 of the hooks 14 on the front side 16 and the rear side 17 respectively are in abutment with surfaces 37, 38 of the locking elements 24, 28 respectively, preventing the locking elements 24, 28 to rotate about the respective axis 29, 32 and thereby preventing the slide 31 to move from its initial position as shown in FIGS. 3A-3B into the direction of the front side 16 of the base 2. The base 2 comprises a handle 41 located near the front side 16 of the base 2, which handle 41 is connected by means of a cable 42 to the slide 31 at position 43. Cable 42 is slidably located in a sheet 44. The function of the base 2, the hooks 14, the locking elements 24, 28 and the slide 31 will now be further explained with reference to FIGS. 4A-5B.

For the sake of clarity the seat 3 is not shown in the FIGS. 4A-5D but only the position of the pins 13 are indicated.

Figure 4A:
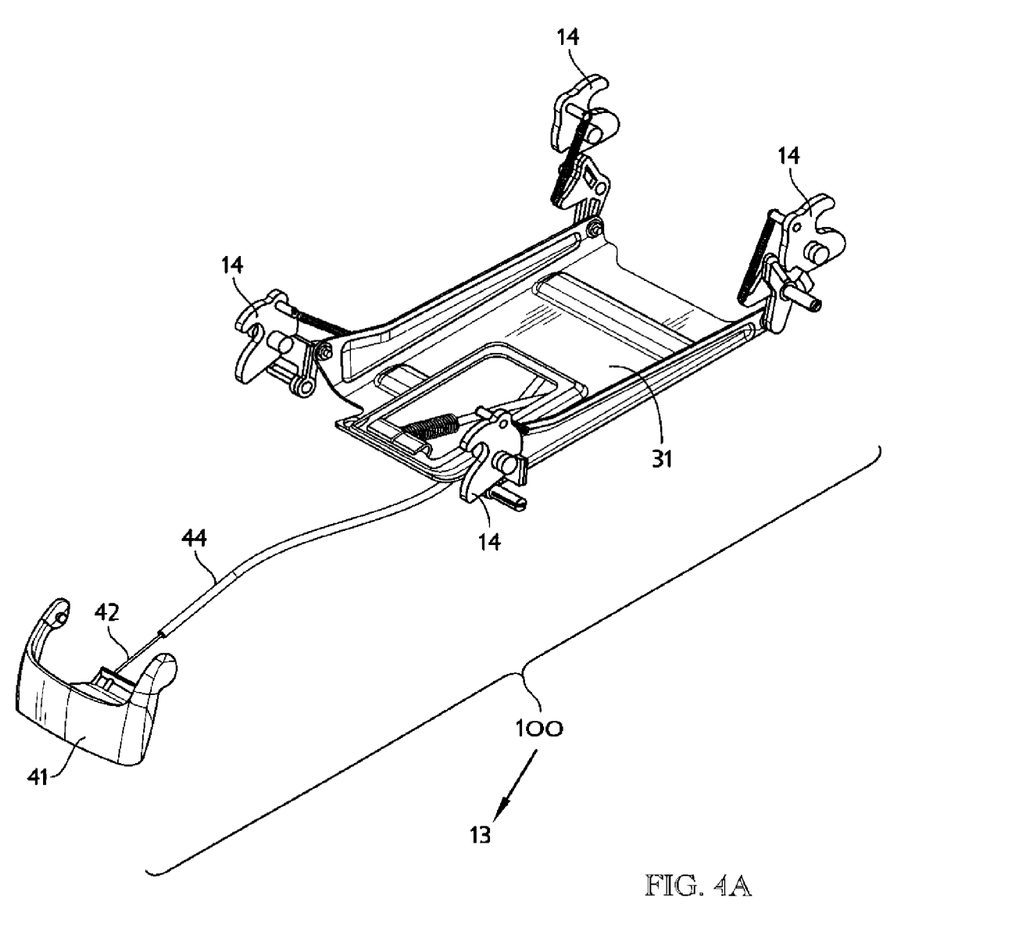
FIGS. 4A and 4B are a perspective view and side view of a part of the base with the hooks in a second position and the slide in the initial position.
Figure 4B:
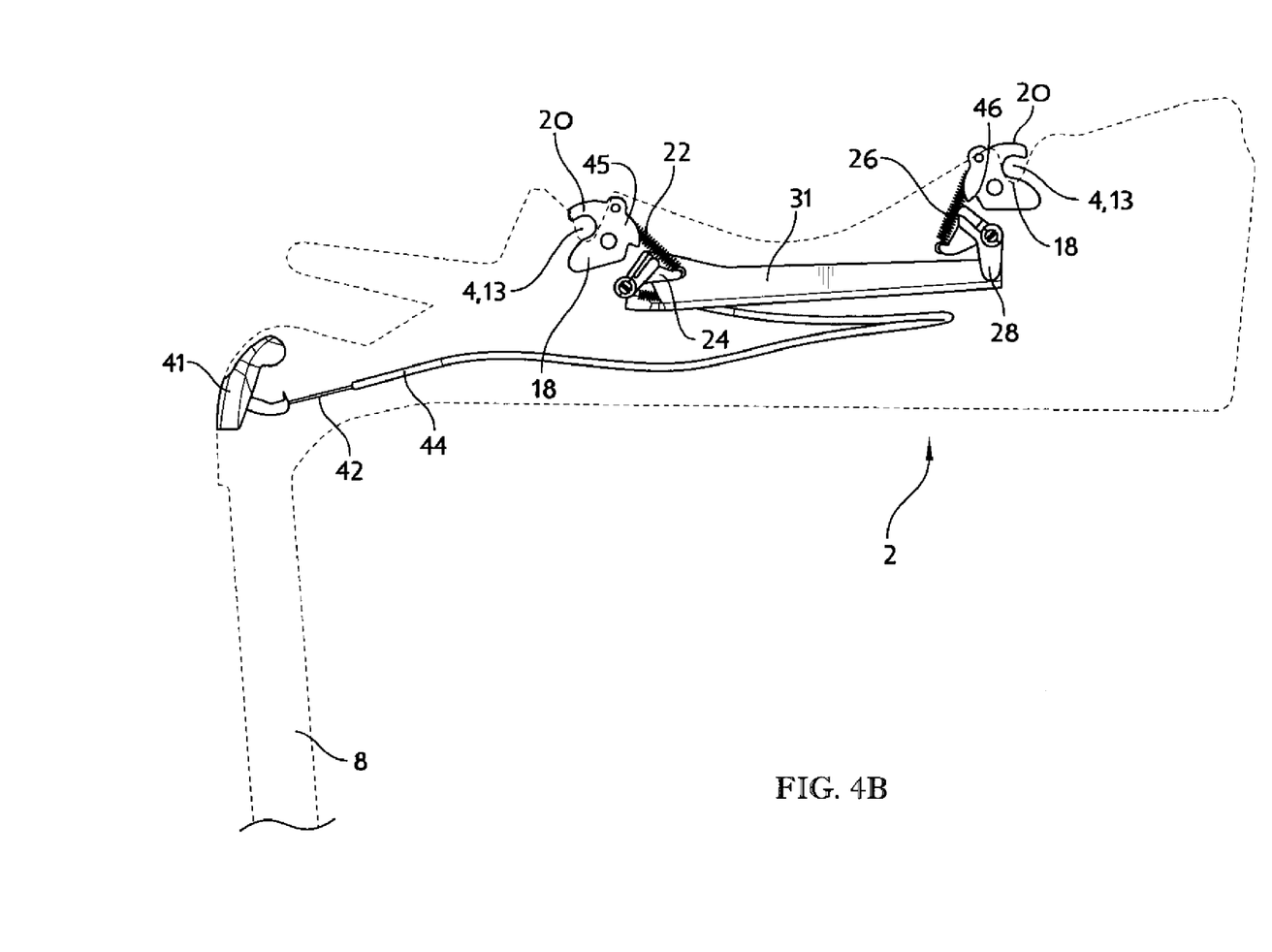

When the user puts the seat 3 on the base 2, the pins 13 are positioned in the recesses 4. By doing so each pin 13 exerts a force on the abutment surface 18 of the respective hook 14 whereby the hook 14 is rotated against the force of the spring 22, 26 respectively in a direction indicated by arrow P3, P4 respectively, to the second position in which the pin 13 is located in the notch 19 and engaged to the base 2 by means of the hook 14 and the gripping surface 20 thereof. When only one, two or three of the hooks 14 are moved from the first position as shown in FIGS. 3A and 3B to the second position as shown in FIGS. 4A and 4B the remaining hook(s) 14 is(are) still in contact with the locking elements 24 or 28 at the surfaces 35, 37 respectively 36, 38. Due to this contact rotation of said locking elements 24 respectively 28 is being prevented and therefore also rotation of the other locking elements 24, 28 is not possible. Only when all hooks 14 have been rotated in the directions indicated by arrows P3, P4 respectively and are brought into the position as shown in FIGS. 4A and 4B, the springs 22, 26 exert a force on the locking elements 24, 28 respectively to rotate the locking elements 24, 28 respectively in the directions indicated by the arrows, P3, P4 respectively whereby the slide 31 is being moved in the direction indicated by arrow P5 (see FIG. 5A) to the front side 16 of the base 2.

The locking elements 24, 28 are rotated in the direction indicated by the arrows P3, P4 until the surfaces 37, 38 respectively abut against locking surfaces 45, 46 of the hooks 14 (see FIGS. 5A-5D). In these positions of the locking elements 24, 28 the hooks 14 can no longer rotate in the direction opposite to the direction as indicated by the arrows P3, P4 respectively so that the pins 13 of the seat 3 are firmly secured to base 2. The slide 31 are now located in the locking position.

In said locking position of the slide 31 and the second positions of the hooks 14 the lengths of the springs 22, 26 are shorter than in the positions as shown in FIGS. 4A-4B whereby slide 31 is still in its initial position but the length of the springs 22, 26 is longer than in the position as shown in FIG. 3A and 3B in which the hooks 14 are in the first position. Due to the relatively short lengths of the springs 22, 26 in the locking position as shown in FIGS. 5A-5D with respect to the initial position of the slide 31 as shown in FIGS. 4A and 4B a firm interaction of the hooks 14 and the locking elements 24, 28 have been obtained with no risk of accidentally unlocking of the hooks 14.

When a user wants to remove the seat 3 from the base 2, the user pulls at the handle 41 against the force of a spring 40 whereby the slide 31 is moved in the direction opposite to the arrow P5 whereby also the locking elements 24, 28 are being rotated in directions opposite to the arrows P3, P4. As soon as the slide 31 is moved back from the locking position to the initial position as shown in FIGS. 4A and 4B the seat 3 can be lifted of the base 2 whereby the pins 13 press against the gripping surface 20 due to which the hooks 14 are rotated back from the second position to the first position as shown in FIGS. 3A and 3B.

It is also possible to use less or more hooks.

The seat 3 may comprises belts for connecting the child to the seat 3. It is also possible to use the belts of the vehicle for this purpose.

A child restraint in accordance with the present disclosure includes a seat and a base. The seat is coupled detachably to the base.

By such a child restraint which is known from the European patent application EP-A1-1.369.295, the base is provided with locating pins as well as locking pins whereby when all locating pins are moved by the seat from a first position, in a second position a slide is being moved to actuate the locking pins and move them to a position in which they engage with the seat.

Although movement of the slide is only possible after all the locating pins are in a second position, an additional check needs to be done to be absolutely sure that after movement of the slide indeed all locking pins are engaged with the seat.

It is one feature of the present disclosure to provide a child restraint whereby a seat can be connected to a base in a relatively quick and more reliable manner.

This feature is accomplished with the child restraint according to the present disclosure in that the base comprises a number of recesses. The child restraint further comprises a seat retainer which includes a number of hooks each being movable from a first position in which a pin connected to the seat can be positioned in the recess to a second position in which the pin is maintained in the recess by the hook and vice versa, the base is further provided with a slide which is movable from an initial position in which the hooks are movable from the first position to the second position and vice versa and a locking position in which all hooks are locked in the second position.

When the slide is being moved from the initial position to the locking position all hooks are already in the second position in which the pins connected to the seat are located in the recesses and engaged by the hooks with the base.

One embodiment of the child restraint according to the present disclosure is characterized in that the slide is maintained in the initial position by at least one hook being in the first position.

In this manner there is a direct relation to the position of the hook and the position of the slide.

Another embodiment of the child restraint according to the present disclosure is characterized in that the hooks are movable from the first position to the second position indepindently of the other hooks.

In this manner the seat can be positioned relatively quick on the base after which due to gravity or due to pulling or pushing of the seat forward by a person putting the seat on the base, the hooks will be moved simultaneously or one after the other from the first position to the second position. As long as not all hooks are moved to the second position and not all the pins are engaged by the hooks with the base, it is possible to lift the seat from the base whereby the hooks will move back to the first position. This is an indication for the adult that the seat is not yet connected to the base.

A yet further embodiment of the child restraint according to the present closure is characterized in that the hooks are rotatable which respect to the base.

Such a rotatable movement is relatively easy to configure.

A further embodiment of the child restraint according to the present disclosure is characterized in the hook is movable by the pin from the first position to the second position against spring force.

Due to the spring force the hooks are normally in the first position and only if sufficient pressure is applied by the pin on the hook, the hook will be moved against the spring force to the second position.

Another embodiment of the child restraint according to the present disclosure is characterized in that the slide is movable from the initial position to the locking position under spring force.

In this manner it is guaranteed that the slide is urged to the locking position as soon as all hooks are in the second position. When the slide is in the locking position, it is no longer possible to remove the seat from the base. Only if the slide is moved against the spring force from the locking position to the initial position, the hooks can be moved again from the second position to the first position and the seat can be disconnected from the base.

A further embodiment of the child restraint according to the present disclosure is characterized in that the slide is provided with locking elements being pivotably connected with a first axis to the base and with the second axis to the slide, whereby in the first position of the hook the locking element prevents the slide from movement to the locking position, whilst in the locking position of the slide the locking element prevents the hook from movement to the first position.

Due to the locking elements a robust construction is being obtained whereby in a clear and unambiguously manner the seat is connected and locked with the base or can easily be disconnected.

The invention claimed is:

1. A child restraint comprising a base formed to include several recesses,
   a seat which configured to be detachably coupled to the base, and
   a seat retainer including a pin connected to the seat and a number of hooks coupled to the base, each hook being movable from a first position in which a pin connected to the seat can be positioned in one of the recesses to a second position in which the pin is maintained in one of the recesses by the hook and vice versa, wherein the seat retainer further includes control means for controlling motion of the hooks relative to the base, the control means including a slide mounted for movement relative to the base from an initial position in which the hooks are movable from the first position to the second position and vice versa and a locking position in which all hooks are locked in the second position.

2. The child restraint of claim 1, characterized in that the slide is maintained in the initial position by at least one hook being in the first position.

3. The child restraint of claim 2, characterized in that each hook is movable by a companion one of the pins from the first position to the second position against a spring force.

4. The child restraint of claim 3, characterized in that the slide is movable from the initial position to the locking position under a spring force.

5. The child restraint of claim 1, characterized in that each of the hooks are movable from the first position to the second position independently of the other hooks.

6. The child restraint of claim 5, characterized in that the base comprises at least two hooks, which are rotatable in opposite directions when moving from the first position to the second position and vice versa.

7. The child restraint of claim 1, characterized in that the hooks are rotatable which respect to the base.

8. The child restraint of claim 1, characterized in that the control means further including a locking element associated with each hook and pivotably connected with a first axis to the base and with a second axis to the slide, and wherein in the first position of the hook the associated locking element prevents the slide from movement to the locking position, whilst in the locking position of the slide the locking element prevents the hook from movement to the first position.

9. A child restraint comprising:
   a base adapted for mounting on a vehicle seat included in a vehicle, the base including a rear side adapted to lie in confronting relation with a seat back of the vehicle seat, an opposite front side arranged to lie in spaced-apart relation to the rear side, a left side arranged to extend between the front and rear sides, and a fight side positioned to lie in spaced-apart relation to the left side and to extend between the front and rear sides, the base being formed to include a first elongated recess positioned to lie between the front and rear sides and a second elongated recess positioned to lie in spaced-apart relation to the first elongated recess and between the first elongated recess and the rear side of the base, and the first and second elongated recesses being arranged to extend between the left and right sides of the base,
   a seat including a seat part having a front edge and a back edge positioned to lie in spaced-apart relation to the front edge, a backrest coupled to the back edge of the seat part and arranged to extend in an upward direction away from the seat part, and a pair of side rests coupled to the seat part and arranged to extend in the upward direction away from the seat part, the side rests being positioned to lie in spaced-apart relation to one another to locate the seat part therebetween, and
   a seat retainer including first and second pins coupled to the seat and control means for mounting the seat on the base to cause the seat to be coupled selectively to the base in response to movement of the first and second pins into the first and second elongated recesses formed in the base to cause pins coupled to the seat part of the seat to be locked into in place in the recesses only upon movement of all the pins into the associated recesses and to cause the pins to remain in the recesses until an unlocking force is applied to the base control means to cause the pins to be freed from the elongated recesses so that the seat may be separated from the base.

10. The child restraint of claim 9, wherein the first pin is positioned to lie between the front edge and the back edge the second pin is positioned to lie in spaced-apart relation to the first pin and between the first pin and the back edge of the seat part, and the first and second pins are arranged to extend between the side rests and configured to lie in the associated elongated recesses formed in the base.

11. The child restraint of claim 10, wherein the control means of the seat retainer includes first and second front hooks coupled to the seat base to rotate about a first front axis extending between the left and right sides of the base between a first position wherein the first pin is free to move in and out of the first elongated recess and a second position wherein the first pin is blocked from moving into and out of the first recess and the control means of the seat retainer further includes first and second rear hooks coupled to the base to rotate about a first rear axis extending between the left and right sides of the base between a first position wherein the second pin is free to move in and out of the second elongated recess and a second position wherein the second pin is blocked from moving into and out of the first and second recess.

12. The child seat of claim 11, wherein the seat retainer further includes a front pair of locking elements coupled to the base to pivot about a second front axis positioned to lie in spaced-apart parallel relation to the first front axis, a rear pair of locking elements coupled to the base to pivot about a second rear axis position to lie in spaced-apart parallel relation to the second rear axis, and a slide coupled to the front pair of locking members and the rear pair of locking members and arranged to extend therebetween.

13. The child seat of claim 12, wherein the seat retainer further includes a front pair of springs arranged to interconnect the front locking elements and the first and second front hooks to provide a spring force to each locking mechanism to bias the locking mechanism into a locked position wherein the front pair of locking elements have pivoted in a counterclockwise direction about the second front axis into engagement with the first and second front hooks to cause rotation of the first and second front hooks about the first front axis to be blocked and to bias the slide to move from an initial position wherein the slide is positioned to lie a first distance from the rear side of the base to a locking position wherein the slide is positioned to lie a relatively larger second distance from rear side of the base.

14. The child restraint of claim 13, wherein the first and second front hooks each include an abutment surface arranged to face in the upward direction upon movement of the hook to the first position and each hook is formed to include a notch arranged to open in the upward direction upon movement of the hook to the first position and the notch is arranged to face toward the front side of the base upon movement of the hook to the second position to form a pin-retaining space therebetween.

15. The child restraint of claim 13, wherein the first and second rear hooks each include an abutment surface arranged to face in the upward direction upon movement of the hook to the first position and each hook is formed to include a notch arranged to open in the upward direction upon movement of the hook to the first position and the notch is arranged to face toward the rear side of the base upon movement of the hook to the second position to form a pin-retaining space therebetween, and the slide, upon movement of the front and rear first and second hooks to the second position, moves toward the front side of the base away from the rear side of the base to establish the locking position of the slide.

16. A child restraint comprising
    a seat configured to support a child,
    a seat-support base arranged to underlie the seat and formed to include laterally extending front and rear pin-receiving recesses, and
    a seat retainer including a front pin coupled to a front portion of the seat and sized to extend into the front pin-receiving recess formed in the seat-support base when the seat is supported on the seat-support base, a rear pin coupled to an opposite rear portion of the seat and sized to extend into the rear pin-receiving recess formed in the seat-support base when the seat is supported on the seat-support base, a front pin lock mounted for movement on the seat-support base between a locked position trapping the front pin in the front pin-receiving recess to couple the front portion of the seat to the seat-support base and an unlocked position opening the front pin-receiving recess to release the front pin for removal from the front pin-receiving recess, a rear pin lock mounted for movement on the seat-support base between a locked position trapping the rear pin in the rear pin-receiving recess and an unlocked position opening the rear pin-receiving recess to release the rear pin for removal from the rear pin-receiving recess, and a slide mounted for movement relative to the seat-support base between an initial position and a locking position and coupled to each of the front and rear pin locks to provide means for allowing movement of each of the front and rear pin locks between the unlocked and locked positions while the slide remains in the initial position and for blocking movement of each of the front and rear pin locks between the unlocked and locked positions upon movement of the slide to the locking position.

17. The child restraint of claim 16, wherein each of the front and rear pin locks includes
    a hook mounted on the seat-support base for pivotable movement about a hook pivot axis relative to the seat-support base and a companion one of the front and rear pin-receiving recesses between a first position allowing movement of one of the front and rear pins into and out of the companion one of the front and rear pin-receiving recesses and a second position blocking movement of one of the front and rear pins located in the companion one of the front and rear pin-receiving recesses out of the companion one of the front and rear pin-receiving recesses,
    a locking element coupled to the seat-support base for pivotable movement about a first element pivot axis and to the slide for pivotable movement about a second element pivot axis, and
    a spring coupled to each of the hook and the locking element and configured to provide means for yieldably pivoting the hook about the hook pivot axis to move from the first position to the second position in response to movement of the slide relative to the seat-support base from the locking position to the initial position.

18. The child restraint of claim 17, wherein the hook includes a stopping surface, the locking element includes a flange, and the stopping surface of the hook engages the flange of the locking element normally to block pivoting movement of the hook about the hook pivot axis when the hook is in the second position and the slide is in the locking position, and wherein the locking element is pivoted about the first element pivot axis to cause the flange to disengage the stopping surface to free the hook to pivot about the hook pivot axis under a pivot-inducing force applied to the hook by the spring to move from the second position to the first position in response to movement of the slide relative to the seat-support base from the locking position to the initial position.

19. The child restraint of claim 18, wherein the flange of the locking element is located in a space provided between the hook pivot axis and the first element pivot axis.

20. The child restraint of claim 18, wherein the hook of the front pin lock is arranged to pivot about a companion hook pivot axis in a counterclockwise direction and the hook of the rear pin lock is arranged to pivot about a companion hook pivot axis in response to movement of the slide relative to the seat-support base from the locking position to the initial position.

* * * * *